United States Patent
Weber et al.

(10) Patent No.: US 10,520,266 B2
(45) Date of Patent: Dec. 31, 2019

(54) METHOD AND DEVICE FOR PROTECTING HEAT EXCHANGER PIPES AND A CERAMIC COMPONENT

(71) Applicant: Martin GmbH fuer Umwelt- und Energietechnik, Munich (DE)

(72) Inventors: Toralf Weber, Emmering (DE); Johannes Martin, Munich (DE)

(73) Assignee: Martin GmbH fuer Umwelt- und Energietechnik, Munich (DE)

( * ) Notice: Subject to any disclaimer, the term of this patent is extended or adjusted under 35 U.S.C. 154(b) by 974 days.

(21) Appl. No.: 14/153,487

(22) Filed: Jan. 13, 2014

(65) Prior Publication Data
US 2014/0196873 A1 Jul. 17, 2014

(30) Foreign Application Priority Data
Jan. 14, 2013 (DE) .......................... 10 2013 000 424

(51) Int. Cl.
| | | |
|---|---|---|
| F28F 19/00 | (2006.01) | |
| F23M 5/08 | (2006.01) | |
| F28G 3/00 | (2006.01) | |
| F22B 37/10 | (2006.01) | |
| F22B 21/30 | (2006.01) | |
| F22G 3/00 | (2006.01) | |

(52) U.S. Cl.
CPC ............ *F28F 19/002* (2013.01); *F22B 21/30* (2013.01); *F22B 37/107* (2013.01); *F22G 3/008* (2013.01); *F23M 5/085* (2013.01); *F23M 2900/05001* (2013.01)

(58) Field of Classification Search
CPC ........ F28F 19/002; F23M 2900/05001; F23M 5/085; F22G 3/008; F22B 37/107; F22B 21/30

USPC .................................................. 165/134.1, 95
See application file for complete search history.

(56) References Cited

U.S. PATENT DOCUMENTS

| | | | | | |
|---|---|---|---|---|---|
| 3,034,769 | A | * | 5/1962 | Henri ...................... | F28F 13/02 165/109.1 |
| 3,110,273 | A | | 11/1963 | Beusman et al. | |
| 3,414,753 | A | * | 12/1968 | Hruda ...................... | H01J 19/36 165/109.1 |
| 3,450,199 | A | * | 6/1969 | Warrell ................... | F28F 13/02 165/109.1 |
| 3,470,624 | A | * | 10/1969 | Plotkowiak .............. | C21D 1/62 165/908 |
| 3,983,927 | A | * | 10/1976 | Steever ................... | F28D 13/00 165/134.1 |

(Continued)

FOREIGN PATENT DOCUMENTS

| | | |
|---|---|---|
| CA | 2 175 846 A1 | 5/2000 |
| CH | 699 405 A1 | 2/2010 |

(Continued)

OTHER PUBLICATIONS

European Examination Report in 14 000 089.4-1605, dated Jul. 17, 2015, with English translation.

*Primary Examiner* — Leonard R Leo
(74) *Attorney, Agent, or Firm* — Collard & Roe, P.C.

(57) ABSTRACT

In a method for protecting heat exchanger pipe in boiler systems having at least one heat exchanger pipe, which is surrounded by a ceramic component, into which flue gas is directed from at least two opposite sides, gas is introduced between the heat exchanger pipe and the ceramic component.

12 Claims, 3 Drawing Sheets

(56) References Cited

U.S. PATENT DOCUMENTS

| | | | |
|---|---|---|---|
| 4,079,702 A * | 3/1978 | Furukawa | F22B 1/1807 |
| | | | 122/421 |
| 4,206,312 A * | 6/1980 | Kuhlmann | F27D 1/12 |
| | | | 165/169 |
| 4,290,388 A * | 9/1981 | Ruhe | E21B 36/025 |
| | | | 122/235.14 |
| 4,617,988 A * | 10/1986 | Kohnen | F23J 3/00 |
| | | | 122/390 |
| 5,810,075 A * | 9/1998 | Deeke | F22B 37/107 |
| | | | 122/DIG. 13 |
| 6,244,330 B1 * | 6/2001 | Eisinger | F28F 9/0132 |
| | | | 165/162 |
| 6,269,754 B1 | 8/2001 | Rueegg et al. | |
| 6,613,127 B1 | 9/2003 | Galloway et al. | |
| 6,675,747 B1 * | 1/2004 | Goidich | F22B 29/062 |
| | | | 122/1 B |
| 2003/0053514 A1 * | 3/2003 | Manasek | F27B 3/065 |
| | | | 373/76 |
| 2011/0139049 A1 | 6/2011 | Kern et al. | |
| 2013/0118421 A1 | 5/2013 | Martin et al. | |

FOREIGN PATENT DOCUMENTS

| | | | | |
|---|---|---|---|---|
| DE | 3806044 A1 * | 8/1989 | | F23M 5/00 |
| DE | 38 23 439 C2 | 6/1996 | | |
| DE | 198 16 059 A1 | 10/1999 | | |
| DE | 100 42 391 A1 | 3/2002 | | |
| DE | 699 07 604 T2 | 3/2004 | | |
| DE | 20 2008 006 044 U1 | 8/2008 | | |
| DE | 10 2010 032 612 A1 | 3/2012 | | |
| EP | 0 981 015 A1 | 2/2000 | | |
| GB | 2 263 330 A | 7/1993 | | |

\* cited by examiner

Cross Section A-A

Cross Section B-B

Cross Section C-C

METHOD AND DEVICE FOR PROTECTING HEAT EXCHANGER PIPES AND A CERAMIC COMPONENT

CROSS REFERENCE TO RELATED APPLICATIONS

Applicant claims priority under 35 U.S.C. § 119 of German Application No. 10 2013 000 424.1 filed on Jan. 14, 2013, the disclosure of which is incorporated by reference.

BACKGROUND OF THE INVENTION

1. Field of the Invention

The invention relates to a method for protecting heat exchanger pipes in boiler systems having at least one heat exchanger pipe, which is surrounded by a ceramic component, into which flue gas is directed from at least two opposite sides. The invention further relates to a device having a heat exchanger pipe, of which the circumferential surface is surrounded by at least one ceramic component, and a ceramic component.

2. Description of the Related Art

One of the functions of heat exchanger pipes in boiler systems is to evaporate water, and another function is to superheat vaporised water. The temperatures in the heat exchanger pipes of larger boiler systems with a downstream turbine are required to be as high as possible, since the efficiency of the downstream turbine increases as the temperature rises.

One drawback associated in particular with incinerators for burning solid fuels, such as waste and biomass incinerators, is that the heat exchanger pipes become corroded. In the course of many investigations, it has been established that this corrosion is induced by deposits of ash and salts left clinging to the pipes. Gas-phase compounds in the flue gas, such as HCl and $SO_2$, affect the composition of these deposits but do not result directly in corrosive attacks on these parts.

Corrosion rates of up to one millimetre per 1,000 hours may be observed in waste and biomass incinerator plants.

In order to help protect against corrosion, ceramic insulation elements and metal coatings are used, applied either as build-up welds or by thermal spraying.

German patent no. DE 38 23 439 C2 describes a pre-sintered protective component made from interlocking half-shell elements. These shell elements, which are preferably made from silicon carbide, have not proven particularly successful in practice, because the material required had to be relatively thick and heavy in order to withstand the load to which it is exposed. The protective component was backfilled with mortar. Since the interlocking arrangement did not allow of any thermal expansion, the high operating temperatures caused the shells to crack and even burst open.

Another ceramic protective sleeve made from overlapping silicon carbide half-shells is described in DE 20 2008 006 044 UI.

Ceramic insulation elements on the walls, such as are described in DE 198 16 059 A1 and EP 0 981 015 A1 have proven to be effective on the walls of the furnace. On the other hand, the use of ceramic protective shells for heat exchanger pipes over which flue gas flows from all sides is not practicable, particularly in the superheating area. Besides the static load of the steel construction, the heat exchanger pipes are exposed to mechanical loads in the superheating area during cleaning.

Beating mechanisms that operate mechanically on the pipes in the superheating area to remove the deposits are used widely. Methods using water and steam blowers are also used in attempts to remove the deposits. This causes additional chemical stresses. These stresses severely limit the areas in which ceramic insulation elements can be used to protect against corrosion in the superheating area.

In the radiation ducts, build-up welds have proven to be an effective corrosion protection measure. The material 2.4858 (Inconel 625) has established itself as the welding material of choice.

However, material temperatures above 400° C., such as are encountered in the superheating area and the vaporisation area under elevated operating pressures, significantly limit the corrosion protection offered by this material. The use of other weld filler materials, such as 2.4606 (Inconel 686), does not provide any significant improvements over other filler materials.

Thermal spraying methods are being used more and more often as a corrosion protection method. Experiments with a wide variety of material compositions as the corrosion protection layer on various boiler parts have revealed that such protective layers can fail unpredictably after a short time. Protective layers of such kind applied by thermal spraying are thus also unable to provide long-term, operationally reliable protection against corrosion.

The method of corrosion protection also affects the effectiveness of the steam generator. Most waste and biogas combustion plants are only operated with steam temperatures of 400° C. at 40 bar, in order to limit the effects of corrosion. If the steam parameters are increased, the rates of corrosion in the boiler pipes also rise substantially, thereby reducing the operational availability of the plant. The known measures for protecting from corrosion did not provide satisfactory improvements in this regard.

SUMMARY OF THE INVENTION

The problem addressed by the invention is therefore to significantly reduce the corrosion of heat exchanger pipes in steam boiler systems even at temperatures well above 400° C.

This problem is solved with a method for protecting heat exchanger pipes in boiler systems having at least one heat exchanger pipe, which is surrounded by a ceramic component, into which flue gas is directed from at least two opposite sides, wherein gas is fed into the space adjacent to the ceramic component. In this context, for the purposes of the invention the term gas is understood to be a gas-phase fluid, a liquid fluid and any fluid in any aggregate states between the two, as well as various forms of steam.

The invention is based on the realisation that even heat exchanger pipes that pass without support through the combustion chamber, and are preferably suspended from the ceiling thereof, can be protected effectively with ceramic components if a gas is supplied between the heat exchanger pipe and the ceramic element.

Heat exchanger pipes that are suspended freely in the smoke flue are only accessible at one end. If a gas is fed into an area between the heat exchanger pipe and the ceramic element, there is a risk that this gas will immediately escape into the combustion chamber through the first gaps between the ceramic elements, and not provide effective protection for all of the heat exchanger pipes. Consequently, the supply of gas was only used for heat exchanger pipes on membrane walls of boiler systems, because there it is easy to deliver the gas to any area of the heat exchanger pipes, and particularly to the areas that are exposed to extreme thermal stresses.

The areas of heat exchanger pipes arranged inside a boiler that are exposed to extreme thermal stresses are at a great distance from the membrane walls and are therefore difficult to reach with the supplied gas. Moreover, the introduction of too much gas into the combustion chamber of the flue ducts has a negative effect on the efficiency of the system.

However, it has been discovered that, with appropriate pressure and design of the ceramic elements, a gas can be delivered to the areas of the heat exchanger pipe that are exposed to the heaviest thermal loading, and then protects the heat exchanger pipe inside a gap between the heat exchanger pipe and the ceramic element in that a slight overpressure is created by the gas and prevents the flue gases from escaping through the ceramic component to the heat exchanger pipes.

The chamber may comprise various parts. It preferably consists only of the heat exchanger pipe and the ceramic component.

It is particularly advantageous if the gas is delivered at the hottest point between the heat exchanger pipe and the ceramic element. The result of this is that the gas is under the greatest pressure at the point where the heat exchanger pipe is under particular thermal stress. Depending on the construction of the boiler system, it may also be advantageous to deliver the gas to the point where the flue gas pressure is highest, that is to say where the counterpressure on the ceramic element is highest.

The ceramic component may be configured such that the supplied gas is routed through the ceramic component. However, since the ceramic component is usually constructed from a plurality of ceramic elements, there is a risk that the delivered gas might escape prematurely between the ceramic elements, with the result that all areas of the heat exchanger pipe might not be exposed to the gas. Even a layer of mortar that is preferably applied between the ceramic elements and connects said ceramic elements is often unable to prevent the gas from escaping.

Therefore, it is suggested to introduce the gas through a pipe included in the ceramic component. This pipe may be made from ceramic, and for example may also be constructed from multiple pipe elements. However, this pipe is preferably a metal pipe. Since this pipe is enclosed by the ceramic component and the inside thereof is cooled by the gas that is passed through it, the gas may be delivered in a metal pipe to the site of a heat exchanger pipe that is under the greatest thermal load. From there, the gas may be distributed, and the gas continues to function as protection for the heat exchanger pipes even if the ceramic component forms a gas-tight casing. This pipe is preferably arranged between the heat exchanger pipes. It is preferably disposed in the middle between an inflow and an outflow heat exchanger pipe.

The gas that is fed into the area between the heat exchanger pipe and the ceramic element at the point of the highest counterpressure may flow along the heat exchanger pipe in gaps between the heat exchanger pipe and the ceramic component, in order to prevent the flue gas from getting into the heat exchanger pipe along the entire length of the heat exchanger pipes.

Particularly in the case of very long heat exchanger pipes, it may be advantageous to introduce the gas at multiple points. Therefore, it is suggested that the gas be supplied through a plurality of apertures in a gas pipe arranged at defined distances along the length of the heat exchanger pipe. The gas serving as the barrier air may then be delivered through a plurality of infeed means arranged all the way up the radiation superheater. This delivery may be effected through apertures or holes between a central air supply channel and the superheating pipes inside the ceramic component, which may be constructed as a shaped brick package. If there is a fault in ceramic components, this results in an assured supply with barrier air even above the damage site.

The task underlying the invention is also solved with a device having a heat exchanger pipe, of which the circumferential surface is surrounded by at least one ceramic component, and which comprises a gas supply to a space adjacent to the heat exchanger pipe and the ceramic component. The device relates to heat exchanger pipes that are not only protected on one side by a ceramic component, but wherein the circumferential surface thereof is also surrounded by at least one ceramic component. In this way, the entire circumferential surface of the heat exchanger pipe is surrounded and protected by the ceramic component, while the gas infeed ensures that no flue gas is able to escape into the heat exchanger pipe through gaps in the ceramic component.

Since the circumferential surface of the heat exchanger pipe is surrounded by the ceramic component, it is suggested that the gas infeed takes place first in the direction of the heat exchanger pipes in the ceramic component, before the gas flows back in the lengthwise direction of the heat exchanger pipes and builds up a gas pressure at gaps in the ceramic component, therefore preventing the flue gas from getting in.

The gas infeed should therefore comprise a fan. Said fan enables the gas pressure to be adjusted such that not too much gas flows through the ceramic component and into the combustion chamber, and on the other hand that sufficient counterpressure is built up over the length of the heat exchanger pipes to prevent flue gases from infiltrating the heat exchanger pipes.

In order to realise this purpose simply, it is suggested that the gas supply comprises a gas pipe that passes inside the ceramic component. The routing inside the ceramic component holds the gas pipe and enables the gas pipe to be supported by the ceramic of the ceramic component.

In many applications, heat exchanger pipes suspended in the combustion chamber are bent into a U-shape to direct water or steam into the combustion chamber and remove it therefrom. With such a configuration, it is suggested that the gas infeed terminates in the area of bend. This makes it possible particularly to cool the bend area, which is particularly heavily loaded, with freshly supplied gas, and/or preferably to build a counterpressure at this loaded site, which prevents flue gases from penetrating as far as the heat exchanger pipe.

In order to ensure a sufficient supply of barrier air even in the event of a fault in the ceramic component, it is suggested that the gas pipe comprises a plurality of apertures positioned at a distance from each other along the length of the heat exchanger pipe. These apertures are preferably provided all the way up the radiation superheater or along the length of the heat exchanger pipe.

The supplied gas is typically air. However, a gas that promotes combustion or affects the combustion, such as oxygen, may be used. Thus for example flue gas or particularly recirculated flue gas after an exhaust gas scrubbing apparatus may also be introduced as the gas.

For both the method and device according to the invention, a ceramic component containing preferably more than 85% silicon carbide and consisting of at least two cuboid ceramic elements having a cross section of arcuate corrugations that are secured to each other by mating corrugation troughs, so that two heat exchanger pipe sections may be arranged in two opposing corrugation troughs and a gas feed pipe section may be arranged in two opposing corrugation troughs between said pair of corrugation troughs.

With such a ceramic component, heat exchanger pipe sections may be protected, a gas may be introduced and a gas pressure may be created between ceramic elements to prevent flue gases from flowing into the heat exchanger pipe sections in particularly simple manner. In this context, the ceramic component is preferably constructed in such manner that contact between the heat exchanger pipe and the ceramic element is avoided.

BRIEF DESCRIPTION OF THE DRAWINGS

The method and an advantageous embodiment as well as ceramic element are represented in the drawing and will be described in the following. In the drawing.

DETAILED DESCRIPTION OF THE PREFERRED EMBODIMENTS

Figures 1, 2:
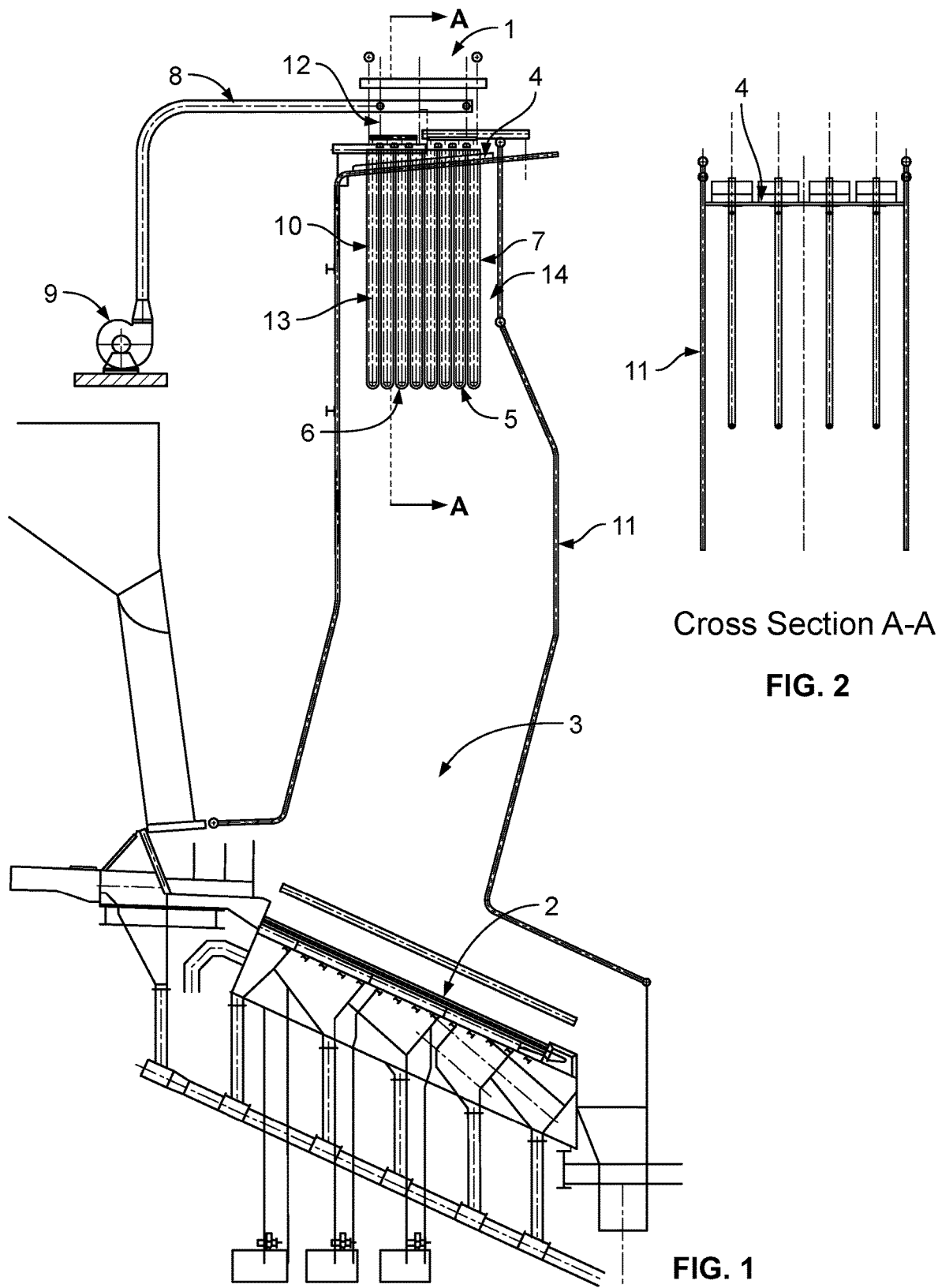
FIG. 1 shows the first duct of a boiler system having superheater coils hanging from the ceiling.
FIG. 2 shows a cross section through the duct of FIG. 1 along line A-A.

Boiler system 1 shown in FIG. 1 consists of a grating 2, a combustion chamber 3 and a superheater coil 5 suspended from ceiling 4. Superheater coil 5 is surrounded by a ceramic component 6, which consists of a plurality of ceramic elements 7, which are connected to each other by mortar. Ceramic component 6 is connected to a fan 9 via a line 8, and heat exchanger pipes 10 of superheater coil 5 are connected to a boiler system 11.

With this configuration, it is possible to feed air between heat exchanger pipes 10 and ceramic component 6 via channels 12 from fan 9 and gas pipes 13. Since ceramic component 6 consists of a plurality of ceramic elements 7, which lie flush with each other but are unconnected, and the mortar between them often does not form a reliable seal, in the event of a leak it is possible for air to flow through ceramic component 6 and into flue gas duct 14, thereby preventing flue gas from escaping flue gas duct 14 to reach heat exchanger pipes 10.

FIG. 2 shows ceiling 4 of flue gas duct 14 with boiler system 11. Ceiling 4 is preferably constructed in such manner that by opening ceiling 4 not only heat exchanger pipes 10 but also gas pipes 13 may be passed in a straight line through gas flue duct 14. In this context, it is advantageous if a ceramic element 7 of ceramic component protrudes through ceiling 4, to ensure that heat exchanger pipes 10 inside flue gas duct 14 are completely covered even in the event of lengthwise variations in the area of heat exchanger pipes 10 and ceramic elements 7.

Figure 3:
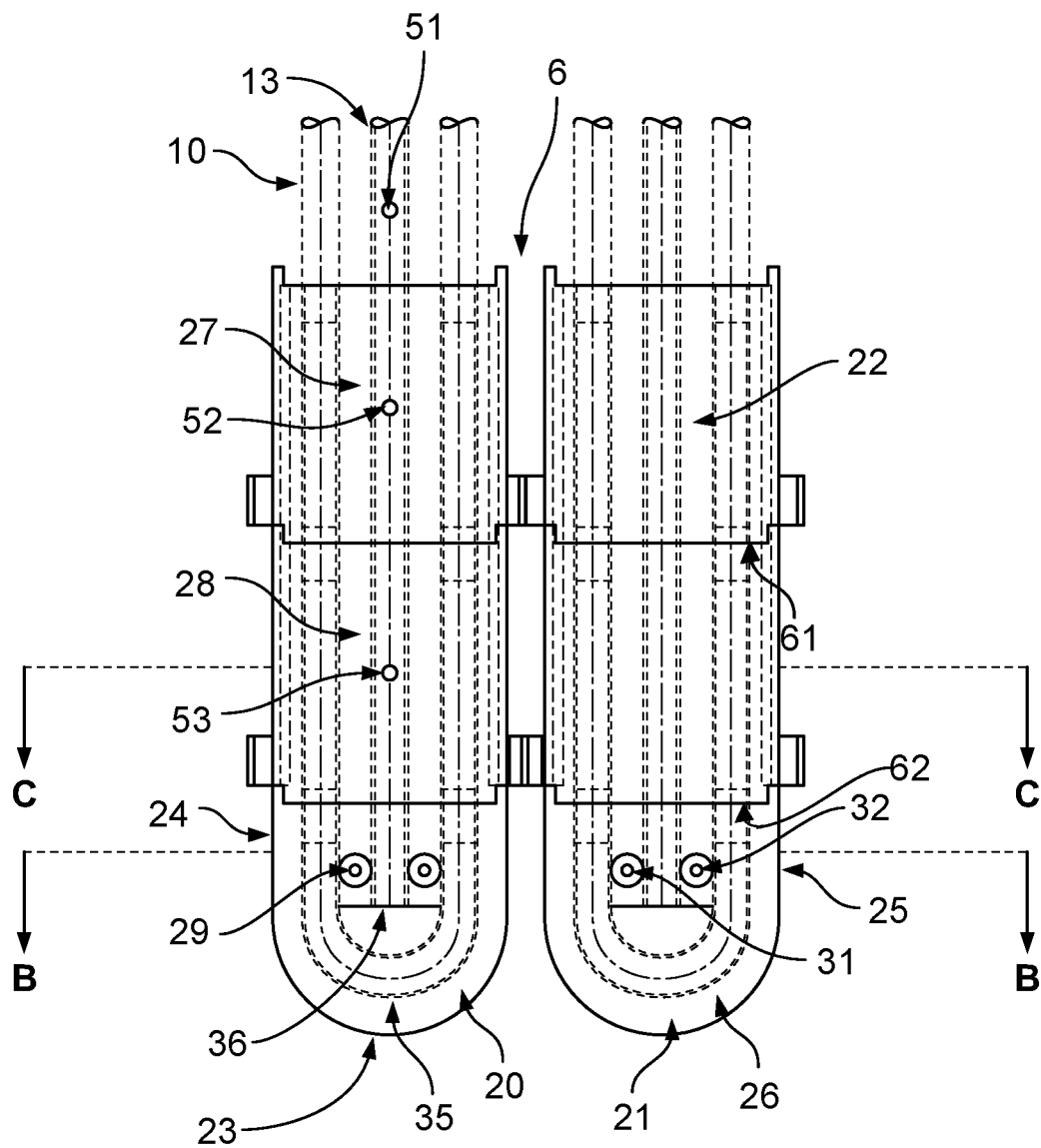
FIG. 3 is an enlarged diagrammatic illustration of heat exchanger pipes with ceramic elements.

The lower end of a part of superheater coil 5 illustrated in FIG. 3 shows two arched plates 20, 21 and one cuboid plate 22. Each plate consists of two ceramic elements 23, 24, 25, 26 and 27, 28. Arched plates 20, 21 consist of two elements 23, 24 and 25, 26, which are attached to each other via a threaded connection 29, 30 and 31, 32, so that each ceramic element forms two opposite sides of ceramic component 6, to which flue gas may be directed.

Cuboid plate 22, formed from two cuboid ceramic elements 27, 28, is represented in an open position, showing corrugations 34 on the inside of ceramic elements 27, 28, which mate with each other to form a circular space 48, 49 for the inflow and outflow of U-shaped heat exchanger pipe 10, and a space 50 therebetween for gas pipe 13. The U-shaped arch of heat exchanger pipe 10 and the routing of gas pipe 13 are indicated with a dashed line. This shows that gas pipe 13 of gas feed 12 ends with an opening 36 in the area of arch 35.

Figure 4:
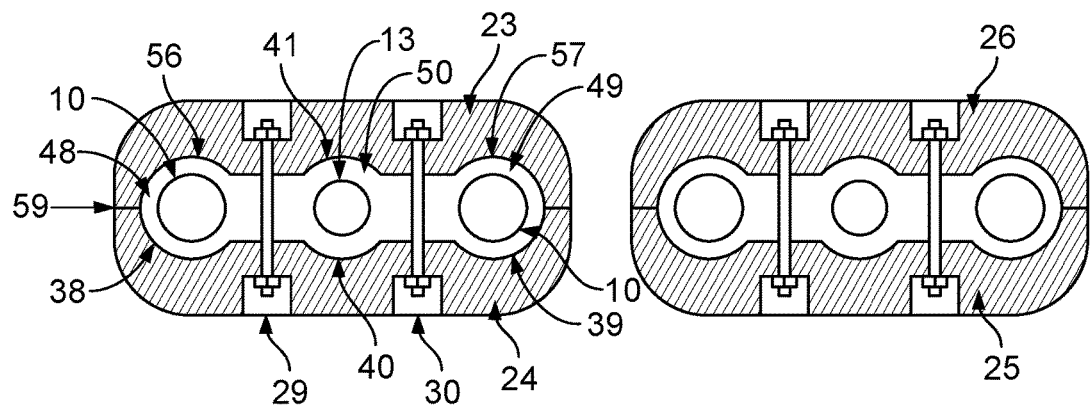
FIG. 4 shows a cross section through a ceramic element for a bent pipe.

FIG. 4 shows a cross section through arched plate 20 with threaded connections 29 and 30. The insides of elements 23 and 24 each have two corrugation troughs 56, 57 and 38, 39 to accommodate heat exchanger pipe 10, and two corrugation troughs 40, 41 therebetween to accommodate gas pipe 13.

Figure 5:
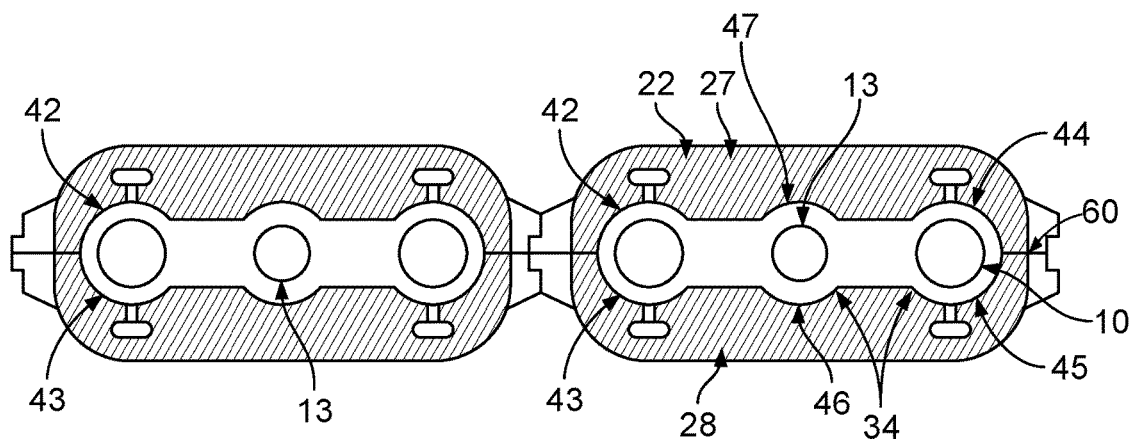
FIG. 5 shows a cross section through a ceramic element for straight pipes.

In a corresponding construction, FIG. 5 shows cuboid plate 22 constructed from two ceramic elements 27, 28, which are attached to one another in positive locking manner, and the insides of which are furnished with corrugation troughs 42 to 45 for a flue gas pipe 10, and corrugation troughs 46, 47 for a gas pipe.

Gas pipe 13 may include holes 51, 52, 53 spread over the length thereof in order to ensure that, if a ceramic component develops a fault, the heat exchanger pipe areas above the faulty area will continue to be supplied with gas. The gas infeed ensures that no flue gas is able to flow from outside the device through gaps 59, 60, 61, 62 in the ceramic component to reach the heat exchanger pipe.

The invention claimed is:

1. A method for protecting heat exchanger pipes in boiler systems having at least one heat exchanger pipe and a ceramic component, the ceramic component comprising several ceramic elements surrounding a circumferential surface of the heat exchanger pipe such that the several ceramic elements form a circumferential cover circumferentially surrounding the circumferential surface of the heat exchanger pipe, a space being between the circumferential surface and the several ceramic elements, the space being adjacent to the heat exchanger pipe and the ceramic component, the space extending along the heat exchanger pipe, and gaps being between the several ceramic elements, the gaps extending from an exterior of the device through the circumferential cover and into the space, the method comprising:

directing flue gas from at least two opposite sides to the ceramic component, and supplying gas into the space via a gas infeed further comprising a fan, wherein the gas supplied protects the heat exchanger pipe between the heat exchanger pipe and the ceramic component via an excess pressure of the supplied gas entering the gaps through the space, wherein:

flue gas outside the device is able to penetrate through the gaps between the several ceramic elements to the space when the supplied gas is not supplied to the space via the gas infeed, and while the supplied gas is supplied to the space via the gas infeed, the supplied gas prevents the flue gas outside the device from penetrating through the gaps between the several ceramic elements to the heat exchanger pipe, and wherein the gas infeed prevents the supplied gas from escaping prematurely between the several ceramic elements, with the result that all areas of the heat exchanger pipe are exposed to the supplied gas.

2. The method according to claim 1, wherein the gas is fed in at the hottest point between the heat exchanger pipe and the ceramic component.

3. The method according to claim 1, wherein the gas is fed in at multiple points.

4. The method according to claim 3, wherein the gas is fed in through a plurality of apertures arranged at a distance from each other in a gas pipe along the length of the heat exchanger pipe.

5. A device comprising:
a heat exchanger pipe having a circumferential surface,
a ceramic component comprising several ceramic elements surrounding the circumferential surface of the heat exchanger pipe such that:
the several ceramic elements form a circumferential cover circumferentially surrounding the circumferential surface of the heat exchanger pipe,
a space is formed between the circumferential surface and the several ceramic elements, the space being adjacent to the heat exchanger pipe and to the several ceramic elements, the space extending along the heat exchanger pipe, and
gaps are between the several ceramic elements, the gaps extending from an exterior of the device through the circumferential cover and into the space, and
a gas infeed to the space, the gas infeed further comprising a fan, so that gas supplied protects the heat exchanger pipe between the heat exchanger pipe and the ceramic component via an excess pressure of the supplied gas entering the gaps through the space,
wherein:
flue gas outside the device is able to penetrate through the gaps between the several ceramic elements to the space when the supplied gas is not supplied to the space via the gas infeed, and
while the supplied gas is supplied to the space via the gas infeed, the supplied gas prevents the flue gas outside the device from penetrating through the gaps between the several ceramic elements to the heat exchanger pipe, and
wherein the gas infeed prevents the supplied gas from escaping prematurely between the several ceramic elements, with the result that all areas of the heat exchanger pipe are exposed to the supplied gas.

6. The device according to claim 5, wherein the heat exchanger pipe is bent in a U-shape and the gas infeed ends in the area of the bend.

7. The device according to claim 5, further comprising a gas pipe furnished with a plurality of apertures at a distance from each other along the length of the heat exchanger pipe.

8. The device according to claim 5, wherein the ceramic component comprises silicon carbide and at least two cuboid ceramic elements having a cross section of arcuate corrugations that are secured to each other by mating corrugation troughs,
wherein the heat exchanger pipe is arranged between a first corrugation trough and a second corrugation trough of the mating corrugation troughs, the first mating corrugation trough opposing the second mating corrugation trough, and
wherein the gas pipe is arranged between a third corrugation trough and a fourth corrugation of the cuboid ceramic elements, the third corrugation trough opposing the fourth corrugation trough.

9. The device according to claim 5, wherein the gas infeed further comprises a gas pipe that passes through the ceramic component and is spaced apart from the heat exchanger tube and from the several ceramic elements.

10. A device comprising:
a heat exchanger pipe having a circumferential surface,
at least one ceramic component surrounding the circumferential surface of the heat exchanger pipe such that a space is formed between the circumferential surface and the at least one ceramic component, the space being adjacent to the heat exchanger pipe and to the ceramic component, the space extending along the heat exchanger pipe, and
a gas infeed to the space, the gas infeed comprising a gas pipe that passes through the ceramic component and is spaced apart from the heat exchanger tube and from the at least one ceramic component,
wherein the heat exchanger pipe is bent in a U-shape and the gas infeed ends in the area of the bend.

11. The device according to claim 5, wherein the gaps between the several ceramic elements form the only gas outlets of the device.

12. The device according to claim 5, wherein the gaps are formed between ceramic elements disposed one above another in the device.

* * * * *